(12) United States Patent
Abraham et al.

(10) Patent No.: US 9,713,170 B2
(45) Date of Patent: Jul. 18, 2017

(54) TECHNIQUES FOR USING TRAFFIC MONITORING FOR CO-EXISTENCE WITH UNLICENSED NETWORKS

(71) Applicant: QUALCOMM Incorporated, San Diego, CA (US)

(72) Inventors: Santosh Paul Abraham, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 14/818,168

(22) Filed: Aug. 4, 2015

(65) Prior Publication Data

US 2017/0041955 A1 Feb. 9, 2017

(51) Int. Cl.
| | |
|---|---|
| H04B 1/00 | (2006.01) |
| H04B 15/00 | (2006.01) |
| H04W 74/08 | (2009.01) |
| H04W 16/14 | (2009.01) |
| H04W 24/08 | (2009.01) |
| H04L 12/413 | (2006.01) |

(52) U.S. Cl.
CPC ....... *H04W 74/0816* (2013.01); *H04W 16/14* (2013.01); *H04W 24/08* (2013.01)

(58) Field of Classification Search
CPC .............................. H04W 24/08; H04W 16/14
USPC .......................................... 370/445; 455/63.1
See application file for complete search history.

(56) References Cited

U.S. PATENT DOCUMENTS

| | | | |
|---|---|---|---|
| 2005/0089057 A1 | 4/2005 | Kang et al. | |
| 2005/0190745 A1* | 9/2005 | Western | H04L 1/0009 370/352 |
| 2011/0019652 A1* | 1/2011 | Atwal | H04W 74/002 370/338 |
| 2012/0082040 A1* | 4/2012 | Gong | H04W 74/0816 370/252 |
| 2014/0031054 A1 | 1/2014 | Zou et al. | |
| 2014/0044105 A1 | 2/2014 | Bontu et al. | |
| 2014/0341135 A1 | 11/2014 | Bhushan et al. | |

(Continued)

FOREIGN PATENT DOCUMENTS

EP 2757850 A1 7/2014

OTHER PUBLICATIONS

Beluri M., et al., "Mechanisms for LTE coexistence in TV white space", Dynamic Spectrum Access Networks (DYSPAN), 2012 IEEE International Symposium on, IEEE, Oct. 16, 2012 (Oct. 16, 2012), pp. 317-326, XP032342357, DOI: 10. 1109/DYSPAN.2012. 6478155,ISBN: 978-1-4673-4447-0.

(Continued)

*Primary Examiner* — Ayodeji Ayotunde
(74) *Attorney, Agent, or Firm* — Haynes and Boone, LLP

(57) ABSTRACT

Systems and techniques are disclosed to manage coexistence of wireless technologies, including 5G unlicensed transmissions, with 802.11 transmissions in the unlicensed band. Aspects of the present disclosure include channel selection and 802.11 traffic monitoring and coordinated access. The systems and techniques include implementing a dynamic duty cycle on a selected channel of an unlicensed 802.11 band and dynamically varying the duty cycle based on traffic load on the selected channel. Other aspects, embodiments, and features are also claimed and described.

32 Claims, 13 Drawing Sheets

(56) References Cited

U.S. PATENT DOCUMENTS

| | | | |
|---|---|---|---|
| 2015/0049709 | A1 | 2/2015 | Damnjanovic et al. |
| 2015/0049712 | A1 | 2/2015 | Chen et al. |
| 2015/0085684 | A1 | 3/2015 | Sadek |
| 2015/0215100 | A1 | 7/2015 | Jeon et al. |
| 2015/0327297 | A1 | 11/2015 | Nilsson et al. |
| 2015/0365973 | A1 | 12/2015 | Choi et al. |
| 2015/0382333 | A1 | 12/2015 | Seok |
| 2016/0088665 | A1* | 3/2016 | Kim .................. H04W 76/021 370/329 |
| 2017/0041956 | A1 | 2/2017 | Abraham et al. |

OTHER PUBLICATIONS

Catt: "Design of LBT Category 4", 3GPP Draft, R1-152577, 3rd Generation Partnership Project (3GPP), Mobile Competence Centre, 650, Route Des Lucioles, F-06921 Sophia-Antipolis Cedex, France, vol. RAN WG1, no. Fukuoka, Japan, May 25, 2015-May 29, 2015, May 16, 2015 (May 16, 2015), 4 Pages, XP050972245, Retrieved from the Internet: URL: http://www.3gpp.org/ftp/tsg_ran/WG1_RL1/TSGR1_81/Docs/ [retrieved on May 16, 2015].

Huawei., et al., "Preamble for Licensed Assisted Access", 3GPP Draft; R1-150985, 3rd Generation Partnershipproject (3GPP), Mobile Competence Centre ; 650, Route Des Lucioles; F-06921 Sophia-Antipolis Cedex; France vol. RAN WG1, no. Paris, France; Mar. 24, 2015- Mar. 26, 2015, Mar. 17, 2015 (Mar. 17, 2015), XP050951351, 8 pages. Retrieved from the Internet: URL: http://www.3gpp.org/ftp/tsg_ran/WG1_RL1/TSGR1_AH/LTE_LAA_1503/Docs/ [retrieved on Mar. 17, 2015].

International Search Report and Written Opinion—PCT/US2016/040852—ISA/EPO—Oct. 18, 2016.

Ratasuk R. et al., "License-Exempt LTE Deployment in Heterogeneous Network", IEEE, International Symposium on Wireless Communication Systems (ISWCS), Aug. 28, 2012 (Aug. 28, 2012), pp. 246-250 , XP032263759, DOI: 10.1109/ISWCS. 2012.6328367, ISBN: 978-1-4673-0761-1.

ZTE: "Remaining Issues on LAA UL", 3GPP Draft; R1-152971 Remaining Issues on LAA UL Final, 3rd Generation Partnership Project (3GPP), Mobile Competence Centre, 650, Route Des Lucioles, F-06921 Sophia-Antipolis Cedex, France, vol. RAN WG1, no. Fukuoka, Japan, May 25, 2015-May 29, 2015, May 16, 2015 (May 16, 2015), pp. 1-6, XP050971566, Retrieved from the Internet: URL: http://www.3gpp.org/ftp/tsg_ran/WG1_RL1/TSGR1_81/Docs/ [retrieved on May 16, 2015].

* cited by examiner

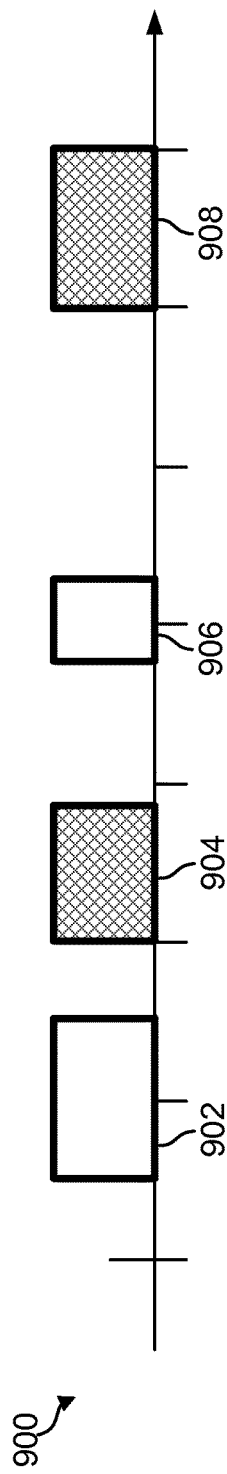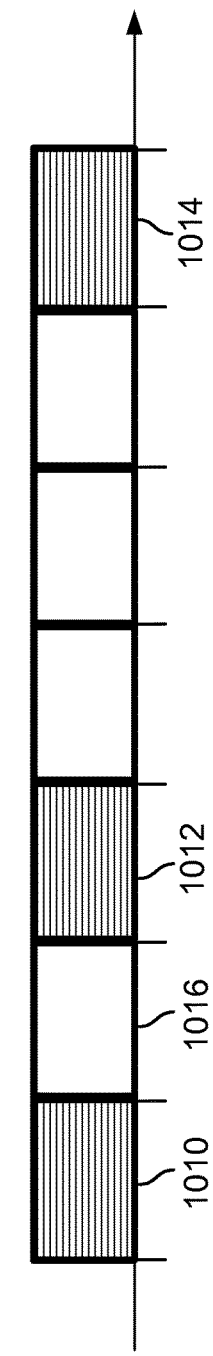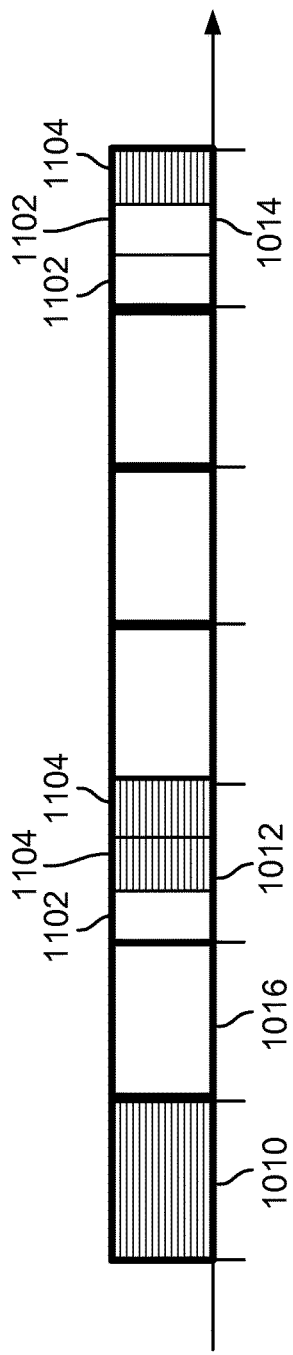

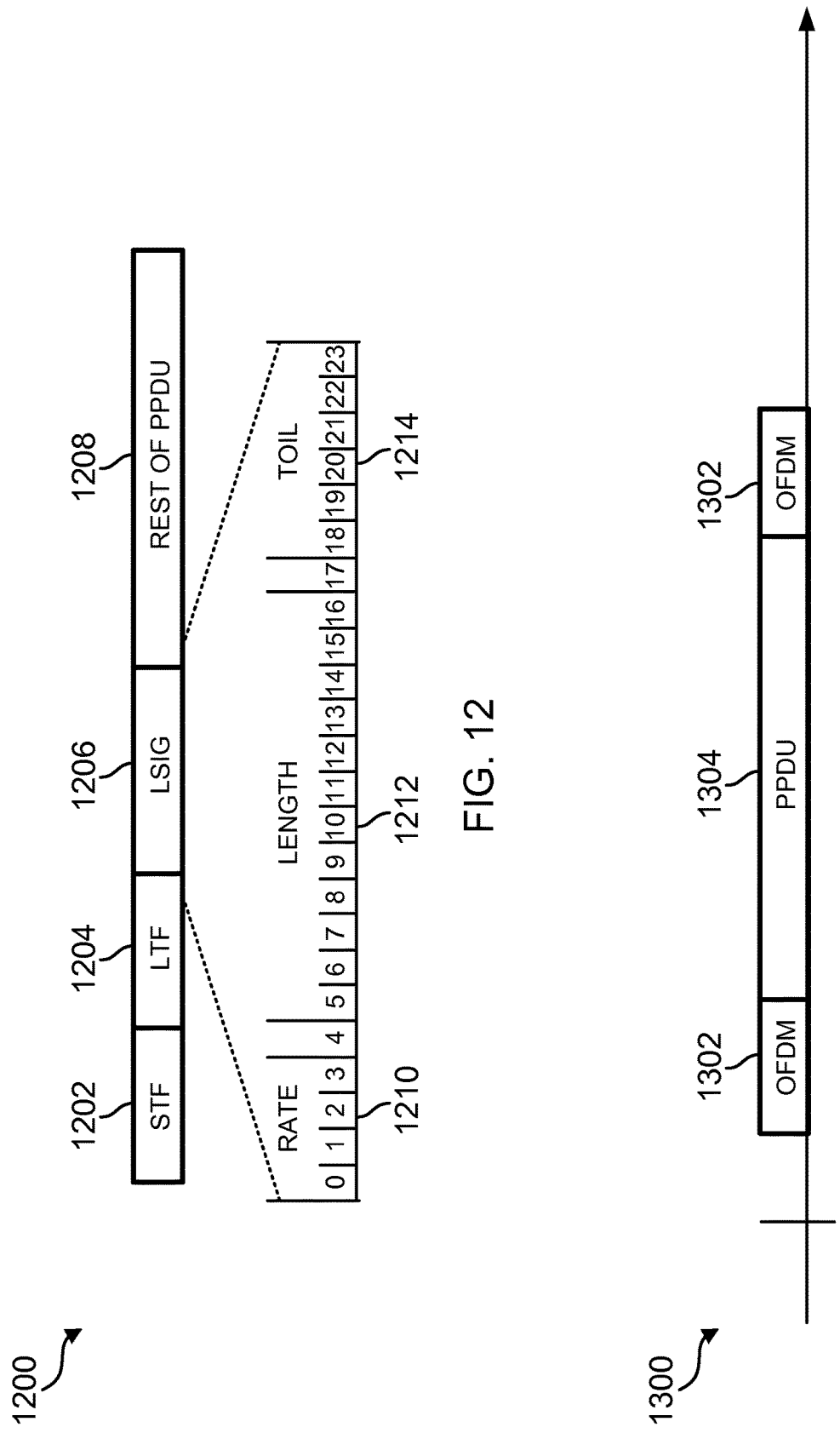

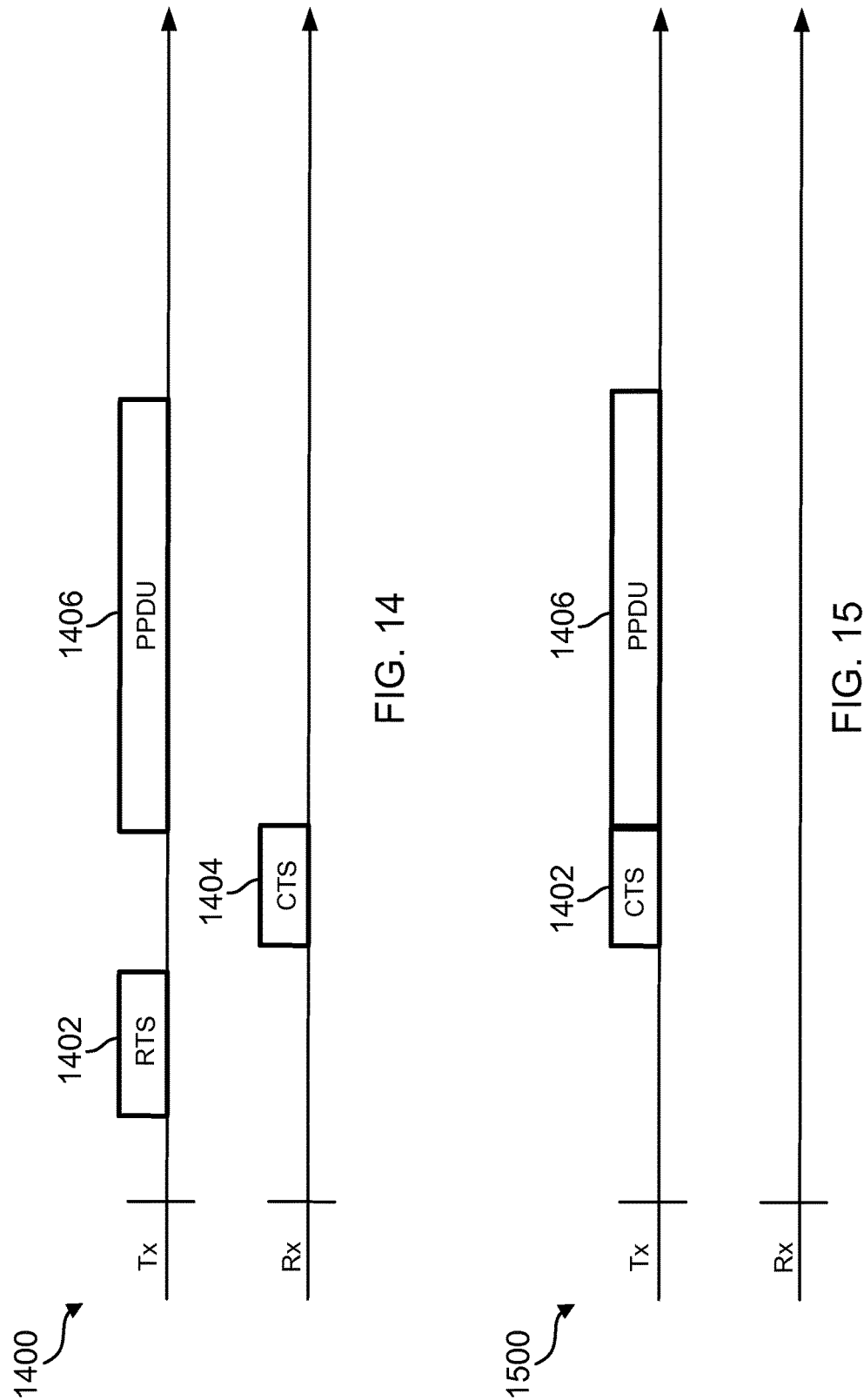

TECHNIQUES FOR USING TRAFFIC MONITORING FOR CO-EXISTENCE WITH UNLICENSED NETWORKS

CROSS-REFERENCE TO RELATED APPLICATIONS

The present application is related to U.S. patent application Ser. No. 14/818,178 filed on the same day and titled "Techniques for Using Collision Avoidance Signaling for Co-existence with Unlicensed Networks", the entire disclosure of which is incorporated herein by reference.

TECHNICAL FIELD

This application relates to wireless communication systems, and more particularly to access technologies that are deployed in unlicensed bands where the incumbent technology is WiFi. Embodiments can enable and provide co-existence between licensed and unlicensed communication networks/systems.

INTRODUCTION

Current wireless practices involve the use of a number of access technologies such as 802.11 (WiFi), 802.15.1 (Bluetooth) and 802.15.4 (ZigBee) in 2.4 GHz ISM (Industrial, Scientific and Medical) and 5 GHz U-NII (Unlicensed National Information Infrastructure) bands. These bands are known as "unlicensed" bands. Data offload in unlicensed bands today is primarily carried out using WiFi. Unlicensed bands have traditionally been unsuitable for use with access technologies designed primarily to operate in "licensed" frequencies. Also WiFi efficiency can be impacted by LTE transmissions.

LTE features such as Carrier Aggregation (CA), however, have made it possible to operate these technologies in unlicensed bands as well, leading to the introduction of LTE-U systems. These systems may offer significantly better coverage and higher spectral efficiency compared to WiFi, while allowing seamless flow of data across licensed and unlicensed bands. These advantages may allow higher data rates, and seamless use of both licensed and unlicensed bands with high reliability and robust mobility through a licensed anchor carrier.

LTE design elements in unlicensed band ensure that LTE-U co-exists with current access technologies such as WiFi on "fair" and "friendly" bases. Challenges exist in detecting and avoiding collisions with ongoing WiFi signal traffic. Although many broadband access systems have interference management mechanisms, these are generally designed to work for terminals of the same technology rather than in heterogeneous wireless protocols and standards that adopt asynchronous time slots.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for managing wireless communications is provided that includes monitoring, using at least a first wireless communication device, traffic on a channel of an unlicensed band during a subset of time slots of the channel, wherein monitoring the traffic on the channel comprises: determining whether a signal is being transmitted in the unlicensed band during one or more time slots of the subset of time slots; and in response to determining that the signal is being transmitted, dynamically varying a duty cycle between adjacent time slots of the subset of time slots to update the subset of time slots; and communicating, using the first wireless communication device, data with a second wireless communication device during a transmission time slot selected based on the updated subset of time slots.

In an additional aspect of the disclosure, a wireless communication device is provided that includes a processor and a co-existence module that monitor traffic on a channel of an unlicensed band during a subset of time slots of the channel, wherein the processor and the co-existence module are configured to: determine whether a signal is being transmitted in the unlicensed band during one or more time slots of the subset of time slots; and in response to determining that the signal is being transmitted, dynamically vary a duty cycle between adjacent time slots of the subset of time slots to update the subset of time slots; and a transmitter that communicates data with a second wireless communication device during a transmission time slot selected based on the updated subset of time slots.

In another aspect of the disclosure, a wireless communication device is provided that includes means for monitoring, using at least a first wireless communication device, a channel of an unlicensed band during a subset of time slots of the channel, wherein the means for monitoring is configured to: determine whether a signal is being transmitted in the unlicensed band during one or more time slots of the subset of time slots; and in response to determining that the signal is being transmitted, dynamically vary a duty cycle between adjacent time slots of the subset of time slots to update the subset of time slots; and means for transmitting, using the first wireless communication device, data with a second wireless communication device during a transmission time slot selected based on the updated subset of time slots.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 illustrates a number of transmissions during a dynamic duty cycle on an unlicensed network in accordance with FIGS. 7-8.

FIG. 10 illustrates an exemplary set of time slot divisions during a time period on an unlicensed band channel, in accordance with FIG. 7.

FIG. 11 illustrates an exemplary set of time slots on an unlicensed band channel in conjunction with the discussion of sub-slots in FIG. 8.

FIG. 12 illustrates an aspect of an exemplary 802.11 transmission including preambles in accordance with various aspects of the present disclosure.

FIG. 13 illustrates another aspect of an exemplary 802.11 transmission including a PPDU surrounded by OFDM symbols in accordance with various aspects of the present disclosure.

FIG. 14 illustrates a diagram of transmitting and receiving collision avoidance signals for 802.11 compatible devices in accordance with various aspects of the present disclosure.

FIG. 15 illustrates a diagram of an alternative for transmitting collision avoidance signals for 802.11 compatible devices in accordance with various aspects of the present disclosure.

DETAILED DESCRIPTION

Figure 1:
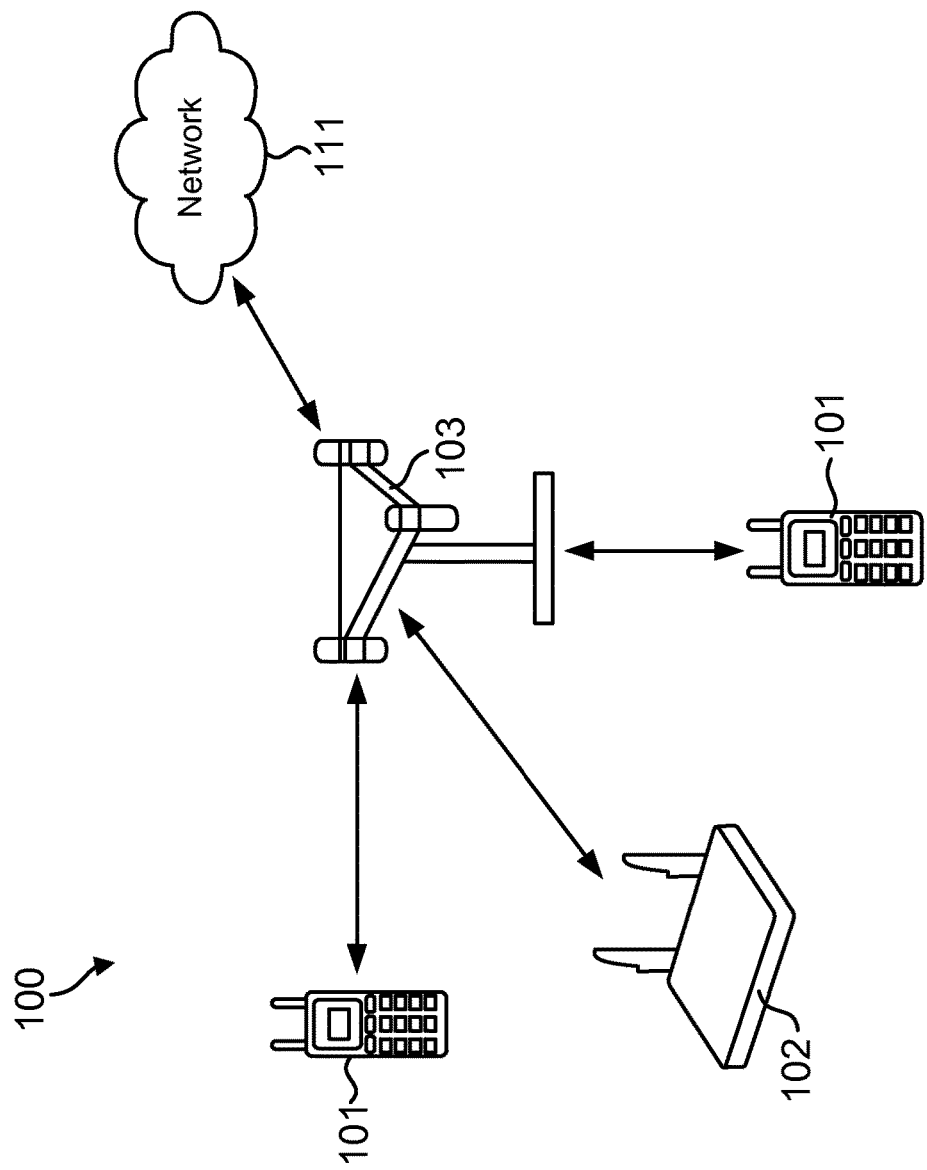
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA, while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network.

Many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Embodiments of the present disclosure introduce systems and techniques to manage coexistence of wireless technologies with WiFi. In particular, aspects of the present disclosure include (1) channel selection, (2) 802.11 traffic monitoring and coordinated access, and (3) collision avoidance to achieve fair access of transmissions on unlicensed bands. The use of wireless technologies such as 5G in unlicensed bands may offer significantly better coverage and higher spectral efficiency than 802.11 networks alone, while providing seamless flow of data across licensed and unlicensed bands in a single core network.

FIG. 1 is a diagram of an exemplary wireless communications environment 100 according to embodiments of the present disclosure. The communications environment 100 may include one or more base stations 103 that can support communication for a number of user equipments (UEs) 101, 102 as well as a core network 111. A UE 101, 102 may communicate with a base station 103 via downlink and uplink. The downlink (or forward link) refers to the communication link from the base station 103 to the UE 101, 102, and the uplink (or reverse link) refers to the communication link from the UE 101, 102 to the base station 103.

A base station 103 may transmit data and control information on the downlink to a UE 101, 102 and/or may receive data and control information on the uplink from the UE 101, 102. In some embodiments, the UEs 101, 102 may be any wireless communication device allowing a user to communicate over a communications network (e.g., a mobile/cellular phone, a smartphone, a personal digital assistant, a wireless modem, a router, personal computer, laptop computer, a tablet computer, server, entertainment device, an appliance, Internet of Things (IOT)/Internet of Everything (IOE) capable device, in-vehicle communication device (e.g., an automobile), etc.), and may be alternatively referred to in different radio access technology (RAT) environments as a User Device (UD), a Mobile Station (MS), a Subscriber Station (STA), a User Equipment (UE), a Subscriber Unit, a terminal, etc.

UEs 101, 102 may be dispersed throughout the communications environment 100, as shown, and each UE 101, 102 may be stationary or mobile. The wireless communication network 100 is one example of a network to which various aspects of the disclosure apply.

Each base station 103 may provide communication coverage for a particular geographic area. In 3GPP, the term "cell" can refer to this particular geographic coverage area of a base station and/or a base station subsystem serving the coverage area, depending on the context in which the term is used. In this regard, a base station 103 may provide communication coverage for a macro cell or a small cell (e.g., a pico cell, a femto cell, etc.), and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a pico cell may be referred to as a pico base station. And, a base station for a femto cell may be referred to as a femto base station or a home base station. A base station 104 may support one or multiple (e.g., two, three, four, and the like) cells.

The base station 103 may include an evolved Node B (eNB), for example. Accordingly, a base station 103 may also be referred to as a base transceiver station, an access point (AP), an eNB, or a wireless network hub. Although FIG. 1 only shows one base station 103, it will be recognized that there could be many base stations 103 within the communications environment 100, as well as be an assortment of different types such as macro and/or small (e.g., pico, femto, etc.) base stations. The base stations 103 may also communicate with one another directly or indirectly, such as via a core network 111.

The communications environment 100 may support synchronous or asynchronous operation. For synchronous operation, the base stations 103 may have similar frame timing, and transmissions from different base stations 103 may be approximately aligned in time. For asynchronous operation, the base stations 103 may have different frame timing, and transmissions from different base stations 103 may not be aligned in time.

In particular, two or more UEs 101, 102 may be used in conjunction to transmit signals across the same unlicensed network channel. The communications environment 100 may support operation on multiple carriers (e.g., waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The communications environment 100 may be a multi-carrier LTE network capable of efficiently allocating network resources. The communications environment 100 is one example of a network to which various aspects of the disclosure apply.

Figure 2:
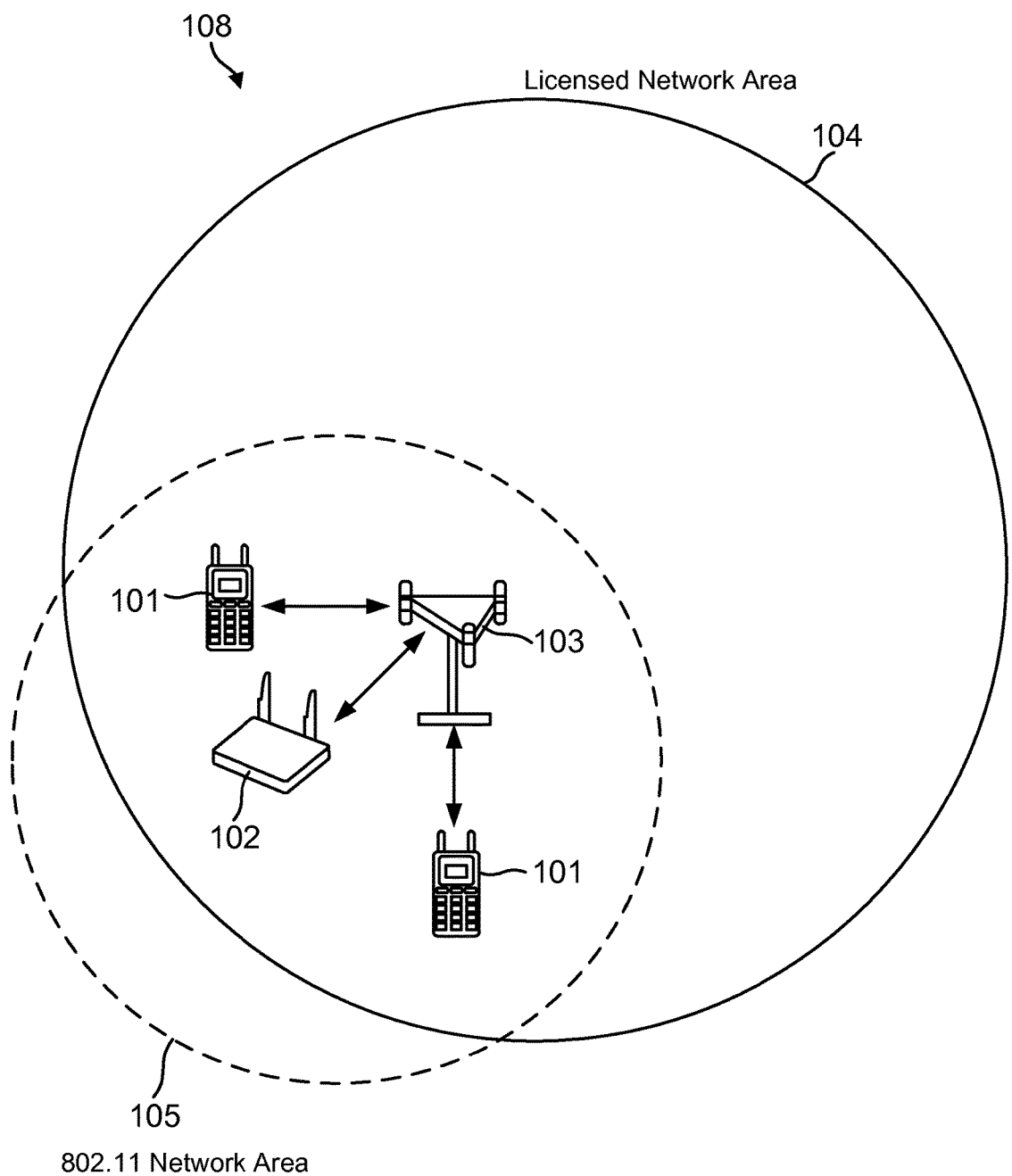
FIG. 2 illustrates a wireless communication network with overlapping 802.11 and cellular networks in accordance with various aspects of the present disclosure.

Referring to FIG. 2, the system 108 comprises one or more UEs 101, 102. In one embodiment such as that shown in FIG. 2, two or more UEs 101 are located within a licensed network area 104 and are further located within an 802.11 network area 105 that is illustrated with a dashed line. In some cases, UEs 101, 102 are in wireless communication with a base station 103. One or more of these devices may be compatible with 802.11 networks.

In another embodiment (not shown in FIG. 2), a single UE 101 is in communication with the base station 103. The UE 101 may be capable of transmitting and receiving wireless signals from two or more network standards including 802.11 signals and 5G signals.

In another embodiment (not shown in FIG. 2), one or more UEs may not be within range of one of the two network areas 104, 105.

Figure 3:
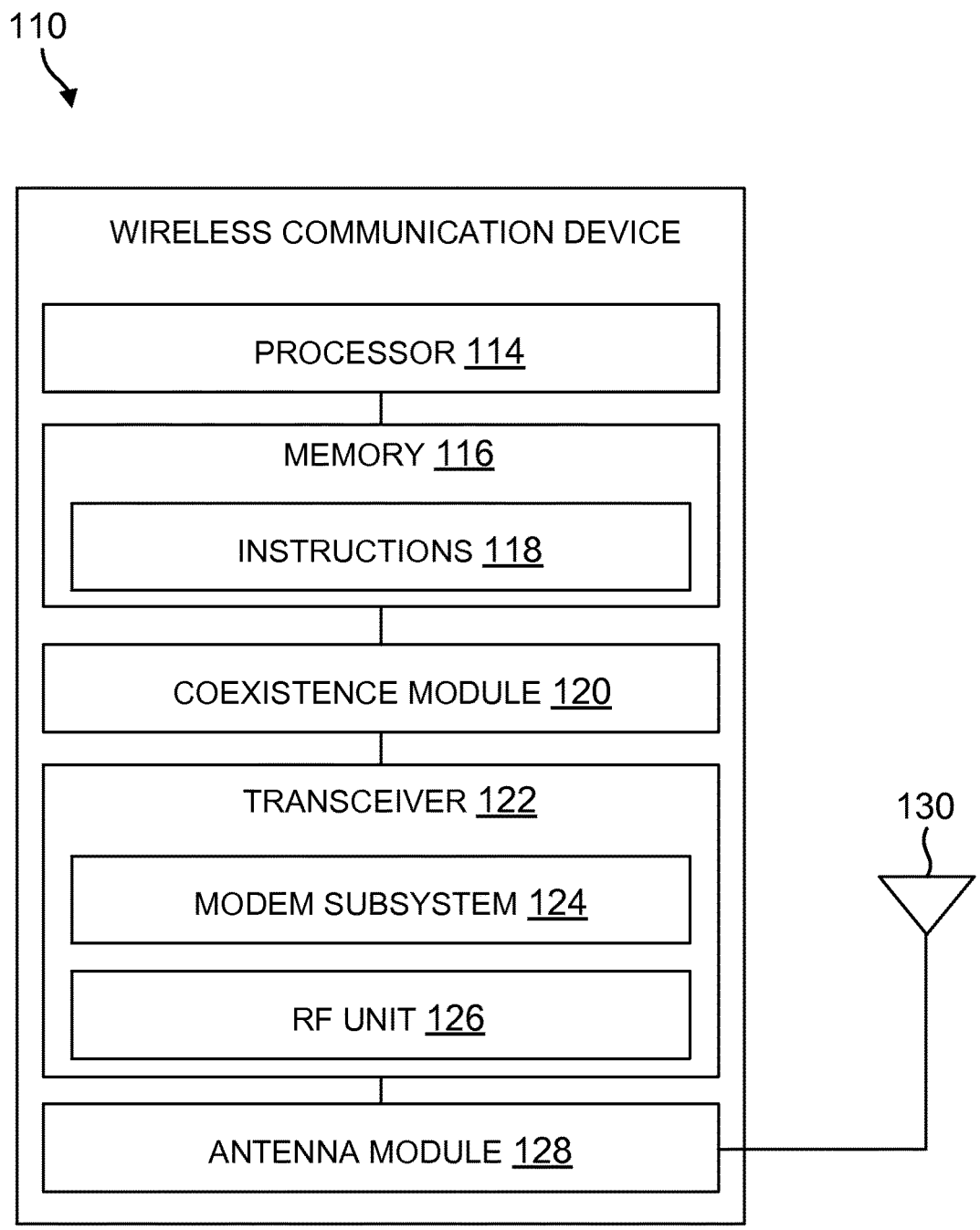
FIG. 3 illustrates a wireless communication network device in accordance with various aspects of the present disclosure.

FIG. 3 shows an exemplary wireless communication device 110. The wireless communication device 110 comprises components that may be interconnected internally including a processor 114, memory 116, coexistence module 120, transceiver 122, and antenna module 128.

In one aspect, the wireless communication device 110 can serve as an evolved Node B (eNB), a generic access point (AP), or a stationary base station (e.g., base station 103 of FIGS. 1 and 2) that is connected to a wireless network via an antenna 130. In another aspect, the wireless communication device 110 can serve as a UE (e.g., UEs 101 and 102 of FIGS. 1 and 2) and be utilized by an end user to communicate with a wireless network.

The wireless communication device 110 is capable of managing coexistence between signals of two or more wireless standards on an unlicensed band. The processor 114 of the device 110 processes signals from the device 110 and may decode transmissions from a connected wireless network. A memory 116 may contain volatile or non-volatile storage devices as well as instructions 118 for decoding, transmitting, and managing wireless signals. Although memory 116 is shown to be separate from processor 114, persons skilled in the art will appreciate that memory 116 can entirely be on-board processor 114 or at least one portion of memory 116 can be on-board processor 114.

The coexistence module 120 of the device 110, in conjunction with the antenna module 128 may scan unlicensed bands to determine signal traffic loads on channels of the network. In one embodiment, the coexistence module 120 and the antenna module 128 may be configured to passively scan one or more unlicensed band channels. In another embodiment, the coexistence module 120 and the antenna module 128 may be configured to actively scan one or more unlicensed band channels. In yet another embodiment, the coexistence module 120 and the antenna module 128 may perform both passive and active scans of one or more unlicensed band channels. The coexistence module 120 may allow the device 110 to implement dynamic duty cycles as discussed below. The coexistence module 120 may be implemented in hardware, software, firmware, or any combination of the above.

In some embodiments, the device 110 comprises a transceiver 122 that is compatible with 802.11 signals. The transceiver 122 is equipped with a modem subsystem 124 and an RF unit 126 that communicates with the antenna module 128. Finally, antenna 130 transmits and receives transmissions through the antenna module 128.

Figure 4:
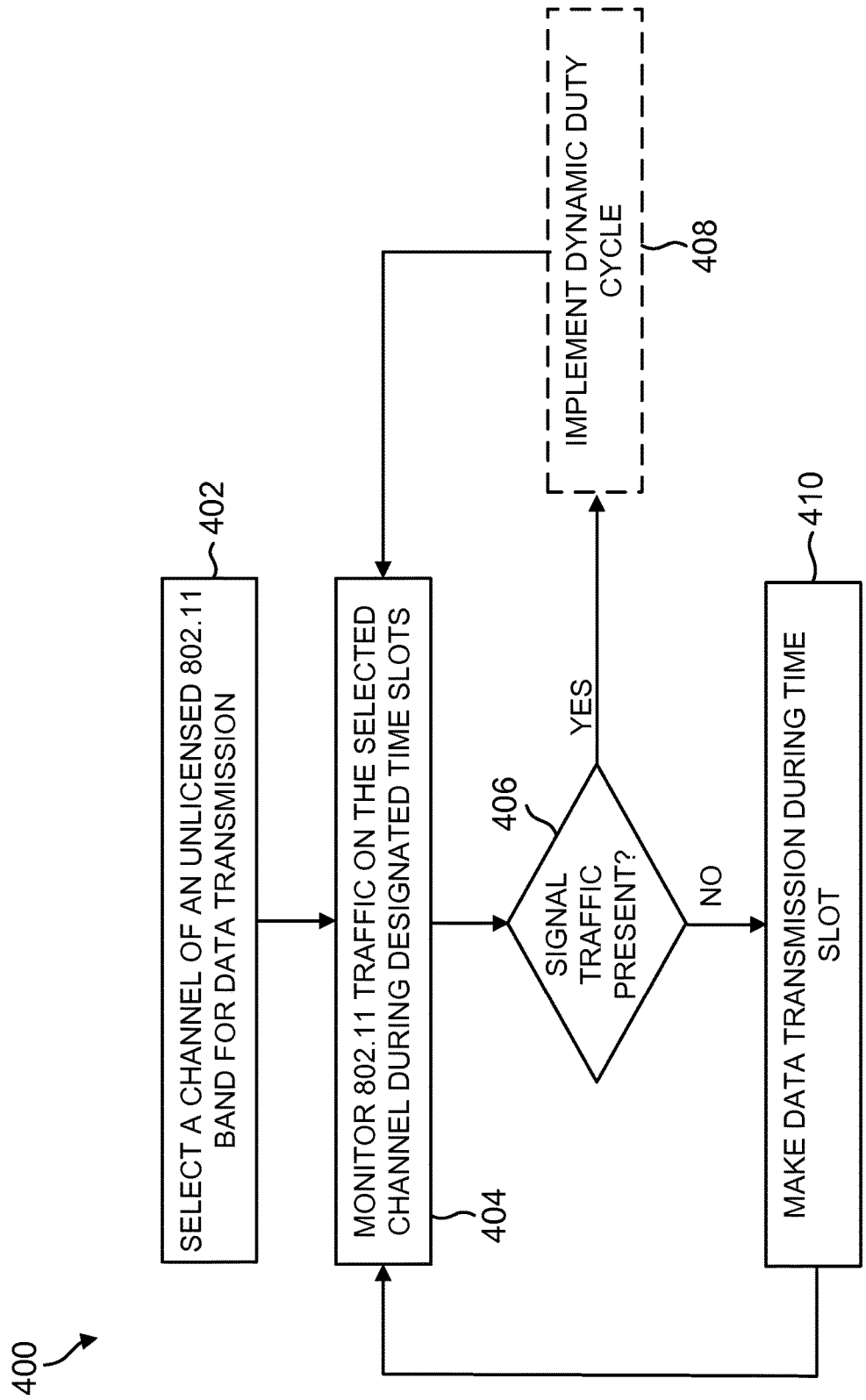
FIG. 4 is a flowchart illustrating a method of monitoring for 802.11 signal traffic in accordance with various aspects of the present disclosure.

In one embodiment, one or more wireless communication devices 110 may monitor unlicensed band channels to determine signal traffic loads and minimize interference with ongoing 802.11 transmissions. The flowchart of FIG. 4 shows a general method 400 for channel selection and traffic monitoring. Method 400 may be performed by a wireless communication device 110 (FIG. 3) or a base station 103. As discussed above, wireless communication device 110 may be a base station (e.g., base station 103 of FIGS. 1 and 2) or a UE (e.g., UEs 101 and 102 of FIGS. 1 and 2).

At block 402, one or more wireless communication devices 110 may select a channel of an unlicensed 802.11 band for data transmission. For example, processor 114 of wireless communication device 110 (FIG. 3) may select a channel of an unlicensed 802.11 band for band transmission.

At block 404, the one or more devices 110 may monitor 802.11 signal traffic on the selected channel during designated time slots. In one embodiment, the block 404 is performed by a single device 110 that continuously monitors the selected channel, as in the case of LTE-U Access Points (as discussed below in conjunction with FIGS. 5 and 6). For instance, co-existence module 120 of FIG. 3 may monitor 802.11 signal traffic on the selected channel during the designated time slots. The co-existence module 120 may use passive or active monitoring. In this embodiment, the device 110 that monitors the channel may communicate the result of its scans to other devices 110, either directly or through a network hub such as a base station 103.

In another embodiment, more than one wireless communication device 110 may monitor the selected channel. In this case, each device 110 may complete a passive or active scan of the unlicensed network. For instance, a co-existence module 120 of each device 110 may monitor 802.11 signal traffic on the selected channel during the designated time slots. When multiple devices are used, each device 110 may scan multiple channels of the unlicensed band. In some embodiments, each device 110 may communicate the result of its respective scans to the other devices 110, either directly or through a network hub such as a base station 103. This approach may allow the devices 110 to compile more accurate signal traffic load results than would be possible for each of the devices 110 alone. These embodiments may lessen the power requirements of the device 110 and may also decrease the duty cycle length of the scan.

At block 406, the one or more devices 110 may determine whether 802.11 signal traffic is present on the selected channel during the designated time slots. For example, processor 114 may determine based on the information provided by the coexistence module 120 whether any 802.11 signals have been received. In one embodiment, the traffic load is measured by totaling the total amount of monitored 802.11 signals measured by the one or more devices 110. In other embodiments, mean or median measurements of signal traffic measured by two or more devices 110 are used to establish the total traffic load.

In some cases, any signal traffic on the unlicensed band will require the device 110 to take additional steps before transmitting a wireless signal on the unlicensed network. Accordingly, in one aspect, if 802.11 signal traffic has been determined to be present on the selected channel during the designated time slot, method 400 may proceed to optional block 408. For example, processor 114 may implement a dynamic duty cycle if it is determined that 802.11 signal traffic is present on the unlicensed band channel. Processor 114 may implement the dynamic duty cycle by adjusting the spacing of designated time slots to take into account 802.11 signal traffic. Block 408 is further discussed in conjunction with FIGS. 7 and 8. After the dynamic duty cycle is implemented, the device 110 may continue to monitor 802.11 traffic on a selected channel at block 404.

On the other hand, if 802.11 signal traffic has not been determined to be present on the selected channel during the designated time slot, method 400 may proceed to block 410. At block 410, the one or more devices may make data transmission during the designated time slots. For example, the processor 114 may implement instructions 118 from memory 116 that cause the transceiver 122 in conjunction with the antenna module 128 to transmit data via the antenna 130. After making the data transmissions, the one or more device may then continue to monitor 802.11 traffic at block 404.

Figure 5:
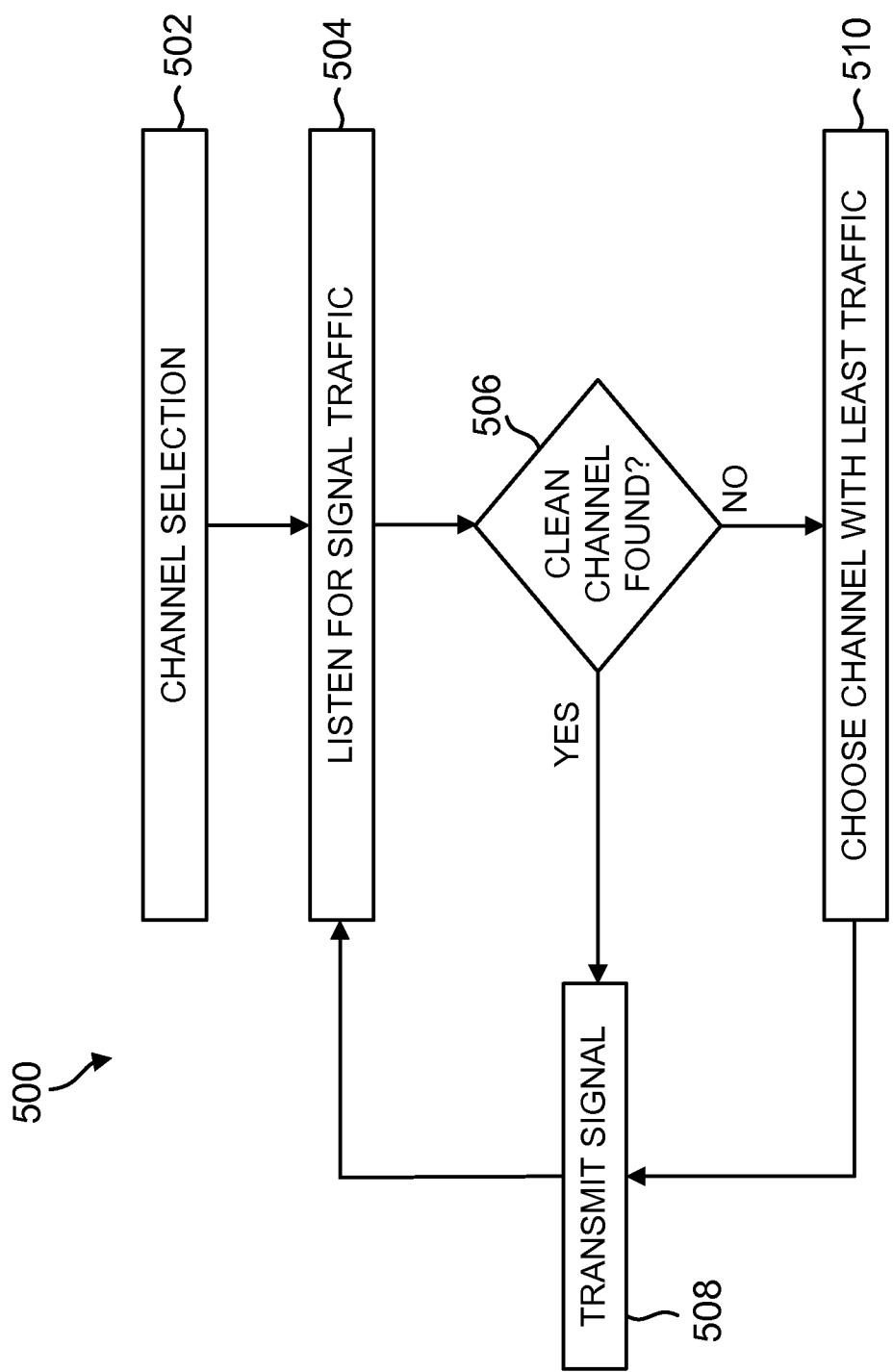
FIG. 5 is a flowchart illustrating a method of passive 802.11 signal traffic monitoring in accordance with various aspects of the present disclosure.

FIG. 5 shows a method 500 of passively monitoring 802.11 signal traffic on an unlicensed band channel. Method 500 may be performed by a wireless communication device 110 (FIG. 3). As discussed above, wireless communication device 110 may be a base station (e.g., base station 103 of FIGS. 1 and 2) or a UE (e.g., UEs 101 and 102 of FIGS. 1 and 2).

At block 502, device 110 may select a channel from the unlicensed band channels. For example, processor 114 of wireless communication device 110 (FIG. 3) may select a channel of an unlicensed 802.11 band for band transmission. This channel may be selected on the basis of previous signal traffic measurements or may simply be selected as a matter of course as device 110 scans an unlicensed band.

At block 504, the device 110 may passively listen for 802.11 signal traffic on the selected channel. For instance, co-existence module 120 may monitor 802.11 signal traffic on the selected channel.

At block 506, the device 110 may determine if it has found a clean channel. As used herein, "a clean channel" can refer to a channel that is completely clear of 802.11 signal traffic. For example, processor 114 may determine based on the information provided by the coexistence module 120 whether any 802.11 signals have been received. If no 802.11 signals have been received, then the channel is clean.

In the case that the channel is completely clear of 802.11 signal traffic, the device 110 may transmit a signal on the channel at block 508. For example, the processor 114 may implement instructions 118 from memory 116 that cause the transceiver 122 in conjunction with the antenna module 128 to transmit data via the antenna 130.

If the device 110 determines that the channel is not completely clear of traffic, the device may continue to monitor channels on the unlicensed band to choose a channel with the least amount of signal traffic at block 510. For example, as in block 506, processor 114 may determine based on the information provided by the coexistence module 120 how many 802.11 signals have been received. As discussed earlier, this measurement of signal traffic may take into account traffic measurements by other devices 110. For example, processor 114 may determine a traffic load measurement by total, mean, or median amounts of signal traffic measured by the one or more devices.

In one embodiment, the device(s) 110 may implement simple channel selection and the processor 114 may choose the channel with the lowest number of signal responses (including no detected signal traffic) that are detected by device(s) 110. In another embodiment, the device(s) 110 may implement advanced signal selection, for example by the processor 114 implementing advanced signal selection instructions 118 from memory 116, and the channel with the lowest amount of signal traffic may be chosen. This embodiment may involve monitoring secondary channels on the unlicensed network. Upon selecting a channel with the least amount of signal traffic, the device 110 may transmit the signal on the channel at block 508, as described above.

Figure 6:
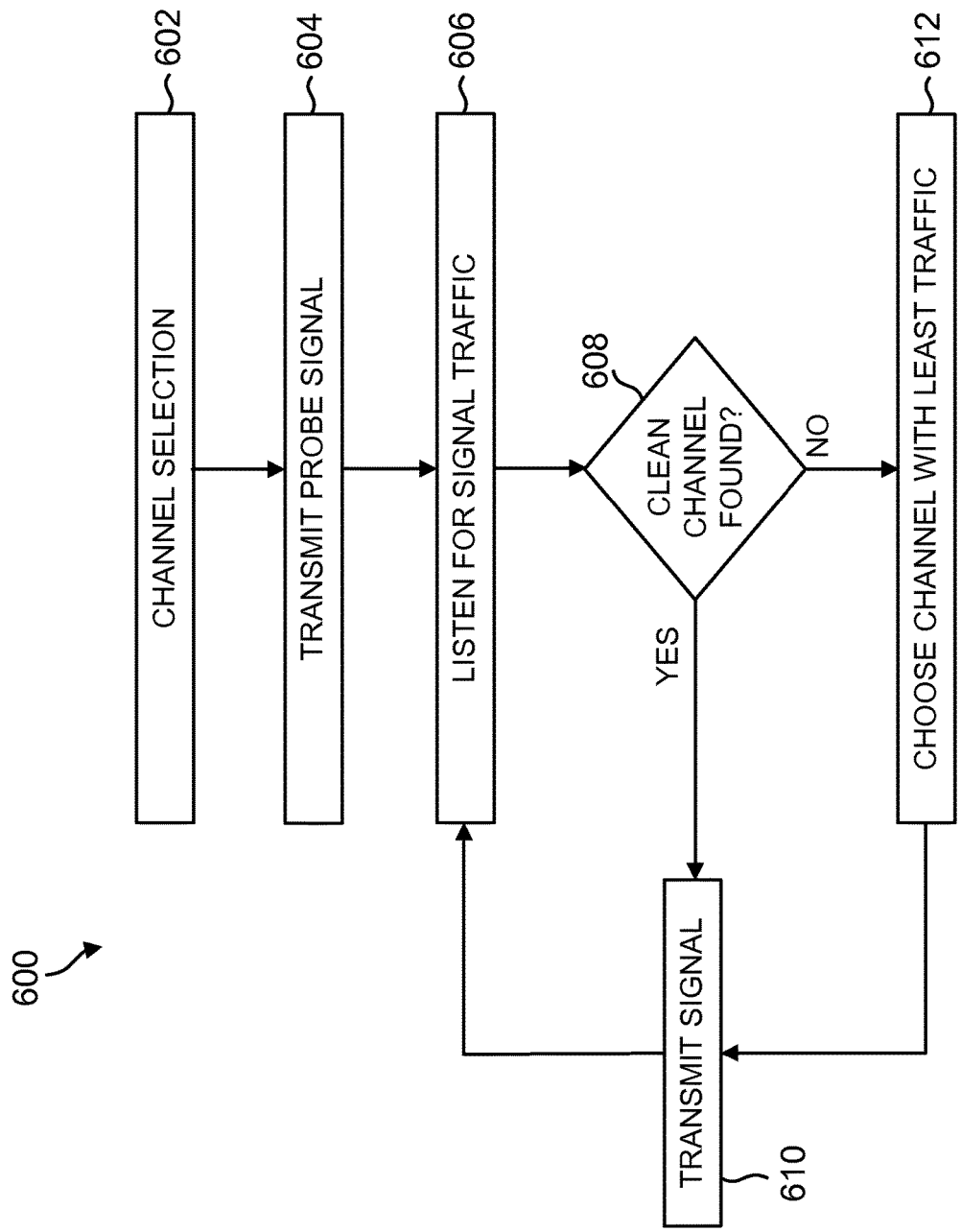
FIG. 6 is a flowchart illustrating a method of active 802.11 signal traffic monitoring in accordance with various aspects of the present disclosure.

FIG. 6 shows a method 600 of actively monitoring 802.11 signal traffic on an unlicensed band channel. Method 600 may be performed by a wireless communication device 110 (FIG. 3). As discussed above, wireless communication device 110 may be a base station (e.g., base station 103 of FIGS. 1 and 2) or a UE (e.g., UEs 101 and 102 of FIGS. 1 and 2).

At block 602, device 110 may select a channel from the unlicensed band channels. For example, processor 114 of wireless communication device 110 (FIG. 3) may select a channel of an unlicensed 802.11 band for band transmission. As in block 502 of FIG. 5, this channel may be selected on the basis of previous signal traffic measurements or may simply be selected as a matter of course as a device 110 scans an unlicensed band.

At block 604, the device 110 may transmit a probe signal on the selected unlicensed band channel. For example, processor 114 may cause coexistence module 120 in conjunction with antenna module 128 to transmit the probe signal. In some instances, the device 110 may transmit a probe signal on multiple unlicensed band channels.

At block 606, the device 110 may actively listen for signal traffic. That is, the device 110 may listen for probe responses from one or more access points or other wireless communication devices operating on the unlicensed band(s). For instance, co-existence module 120 may monitor the selected channel for responses to the probe signal.

At block 608, the device 110 may determine whether a clean channel is found (e.g., the channel is completely clear of 802.11 signal traffic). For example, the processor 114 may determine whether any probe responses have been received by the device 110. If the device 110 determines that a clean channel has been found, at block 610, the device 110 may transmit a signal on the channel.

If the device 110 instead determines that a clean channel has not been found (e.g., the channel is not completely clear of 802.11 traffic), the device may continue to monitor channels on the unlicensed band to choose a channel with the least amount of signal traffic at block 612. For example, as in block 608, processor 114 may determine whether how many probe responses have been received by the device 110. As discussed earlier, this measurement of signal traffic may take into account traffic measurements by other devices 110 and may determine a traffic measurement by total, mean, or median amounts of signal traffic measured by the one or more devices.

After the device 110 has chosen a channel with the least amount of signal traffic, it may transmit a signal at block 610, as described above.

Figure 7:
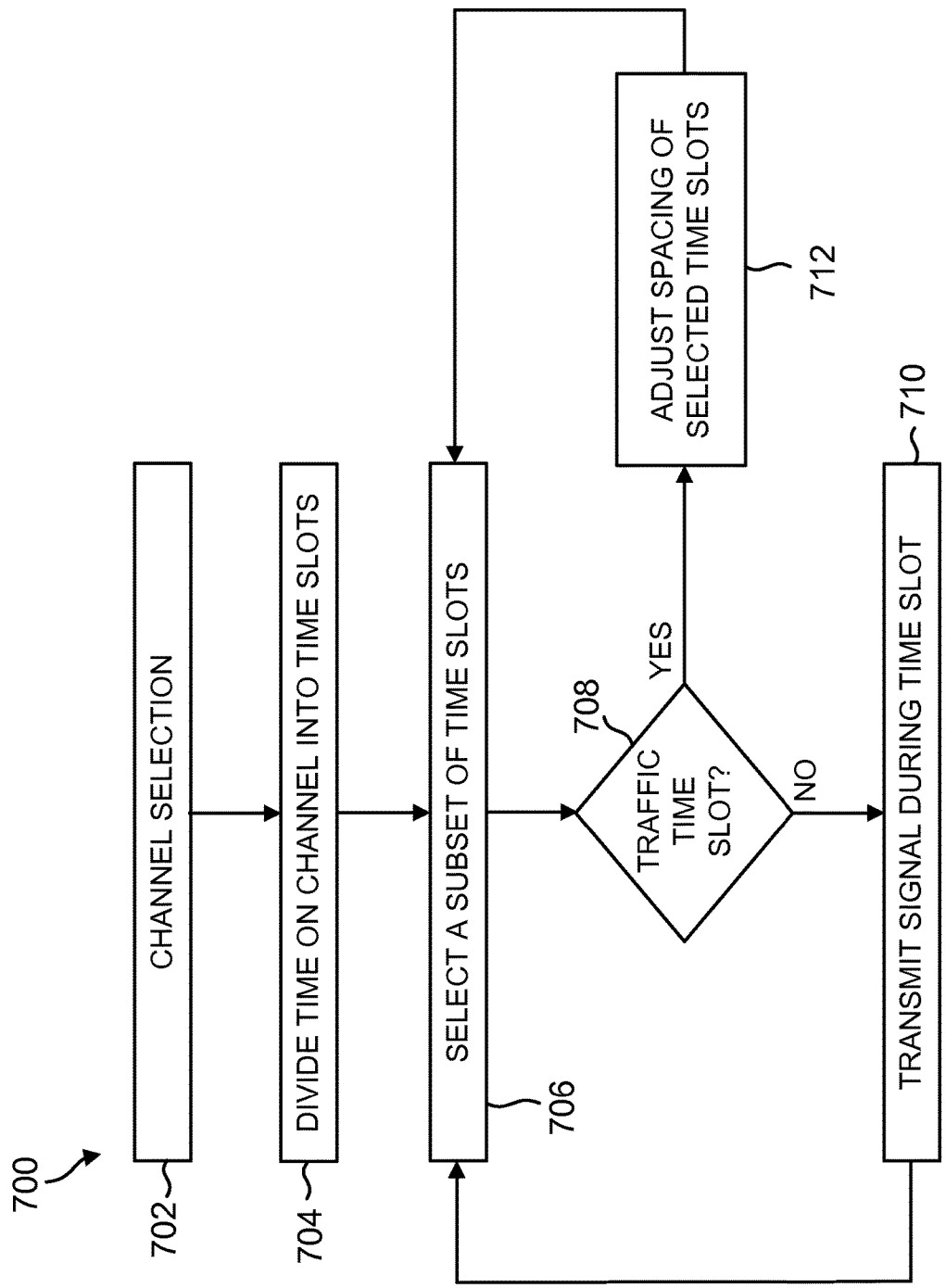
FIG. 7 is a flowchart illustrating a method of implementing a dynamic duty cycle by dividing a channel into time slots and monitoring for 802.11 signal traffic in a subset of those time slots in accordance with various aspects of the present disclosure.

The flow diagram of FIG. 7 shows an exemplary method 700 of implementing a dynamically varying duty cycle. Method 700 may be performed by a wireless communication device 110 (FIG. 3). As discussed above, wireless communication device 110 may be a base station (e.g., base station 103 of FIGS. 1 and 2) or a UE (e.g., UEs 101 and 102 of FIGS. 1 and 2).

At block 702, one or more wireless communication devices 110 may select a channel on an unlicensed band network as previously discussed. For example, processor 114 of wireless communication device 110 (FIG. 3) may select a channel of an unlicensed 802.11 band for band transmission. This channel may be selected on the basis of previous signal traffic measurements or may simply be selected as a matter of course as device 110 scans an unlicensed band.

At block 704, the device 110 may divide time on the channel into multiple time slots. For example, processor 114 may logically separate the channel into increments of a specified duration. In one embodiment, the duration for each time slot may be 10 ms or more. In another embodiment, the duration of each time slot may be less than 10 ms.

At block 706, the device 110 may select a subset of time slots from the multiple time slots. In one embodiment, the processor 114 may select a subset that may contain a number of consecutive time slots. In another embodiment, the selected subset of time slots may be separated by a random number of unselected time slots. In one aspect, the number of unselected time slots placed between selected time slots may depend on 802.11 signal traffic loads on the channel.

At block 708, device(s) 110 may determine if there is traffic (e.g., 802.11 signal traffic) in the selected subset of time slots by passively or actively monitoring 802.11 signal traffic on the selected channel during the selected subset of time slots. In an aspect, the passive and active monitoring may proceed in a similar way as described in block 504 of method 500 (FIG. 5) and block 606 of method 600 (FIG. 6), respectively.

If it is determined that there is no traffic in the selected subset of time slots as described, for example, in block 506 of method 500 and block 608 of method 600, the device(s) 110 may transmit a signal during the selected subset of time slots at block 710, as described above.

If it is determined that there is traffic in the selected subset of time slots, the device(s) 110 may adjust the spacing of the selected subset of time slots at block 712. In one embodiment, as larger signal traffic volumes are measured by the device 110 on the channel, processor 114 may update its selection of time slots by selecting a subset of time slots that are farther apart from each other. This may help to minimize the risk of collisions between 802.11 signals and other wireless signals transmitted by the device 110. Thus, one aspect of a "dynamic duty cycle" or "dynamically varying duty cycle" may include selecting a subset of time slots and adjusting the spacing between the selected subset of time slots based on signal traffic.

Figure 8:
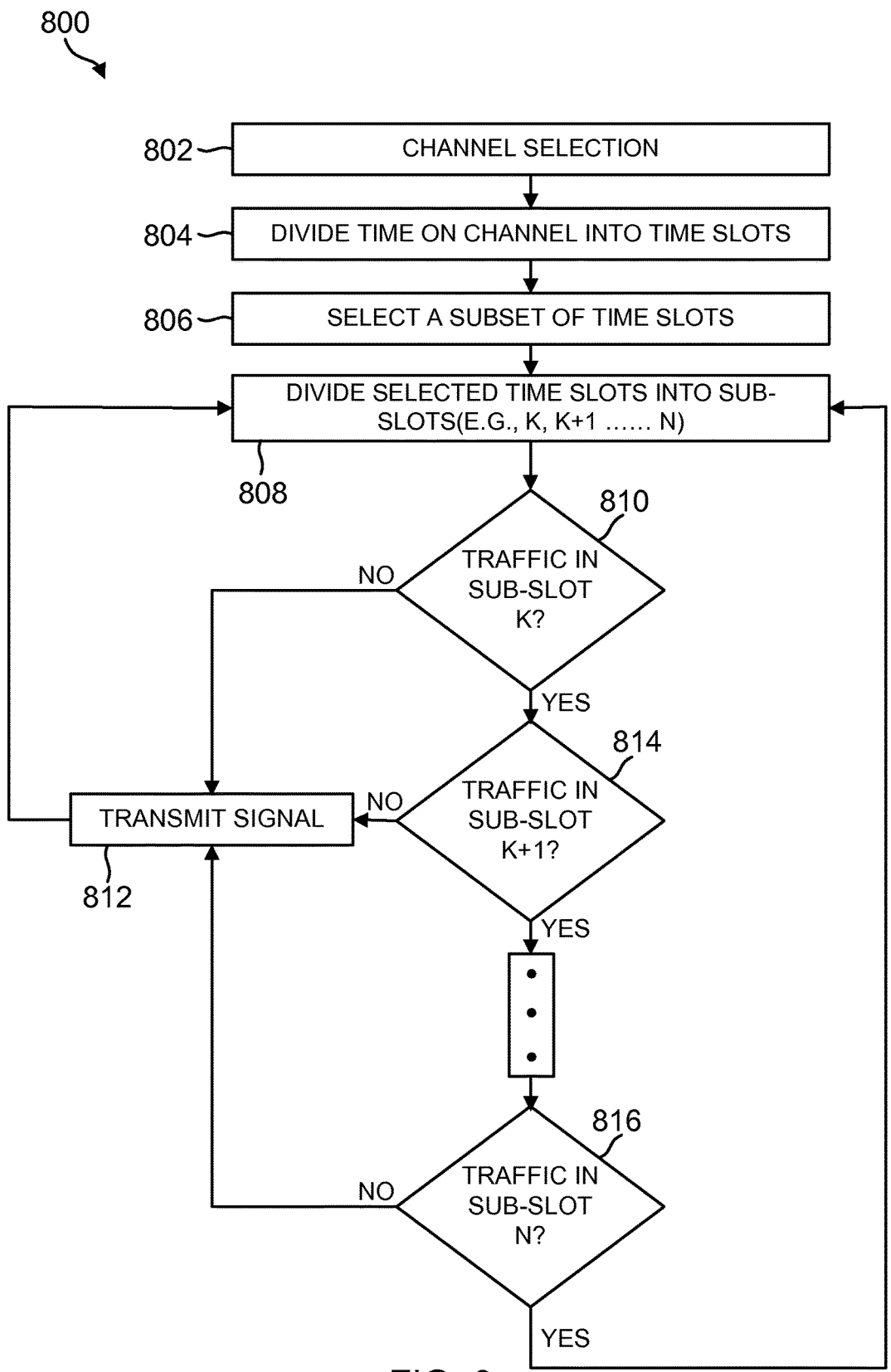
FIG. 8 is a flowchart illustrating a method of implementing a dynamic duty cycle by dividing a channel into time slots, dividing the time slots into sub-slots, and monitoring for 802.11 signal traffic in the sub-slots of a subset of those time slots in accordance with various aspects of the present disclosure.

Along with selecting time slots based on signal traffic, another aspect of the dynamic duty cycle of the present disclosure may also include subdividing time slots. FIG. 8 shows a flow diagram of an exemplary method 800 of subdividing time slots for signal traffic monitoring. Method 800 may be performed by a wireless communication device 110 (FIG. 3). As discussed above, wireless communication device 110 may be a base station (e.g., base station 103 of FIGS. 1 and 2) or a UE (e.g., UEs 101 and 102 of FIGS. 1 and 2).

At block 802, device 110 may select a channel on an unlicensed band as previously discussed. For example, processor 114 of wireless communication device 110 (FIG. 3) may select a channel of an unlicensed 802.11 band for band transmission. This channel may be selected on the basis of previous signal traffic measurements or may simply be selected as a matter of course as device 110 scans an unlicensed band.

At block 804, device 110 may divide time on the channel into a plurality of time slots, as described above at block 704 of method 700 (FIG. 7). For example, processor 114 may logically separate the channel into increments of a specified duration. In one embodiment, the duration for each time slot may be 10 ms or more. In another embodiment, the duration of each time slot may be less than 10 ms.

At block 806, device 110 may select a subset of time slots for signal traffic monitoring at, as discussed in conjunction with block 706 of method 700 (FIG. 7). In one embodiment, the processor 114 may select a subset that may contain a number of consecutive time slots. In another embodiment, the selected subset of time slots may be separated by a random number of unselected time slots. In one aspect, the number of unselected time slots placed between selected time slots may depend on 802.11 signal traffic loads on the channel.

At block 808, device 110 may divide each selected time slot into a plurality of sub-slots (e.g., k, k+1 . . . n). In one embodiment, processor 114 may divide subsets into sub-slots may have a duration of 5 ms or less. In another embodiment, processor 114 may divide subsets into sub-slots that have a duration of 20 ms or less.

At block 810, if an initial sub-slot (sub-slot k) is found to be clear of 802.11 signal traffic, the device 110 may transmit a signal during that sub-slot at block 432, as described above. For example, device(s) 110 may determine if there is traffic (e.g., 802.11 signal traffic) in the selected subset of time slots by passively or actively monitoring 802.11 signal traffic on the selected channel during the selected subset of time slots. In an aspect, the passive and active monitoring may proceed in a similar way as described in block 504 of method 500 (FIG. 5) and block 606 of method 600 (FIG. 6), respectively.

Alternatively at block 810, if an initial sub-slot (sub-slot k) is found to be occupied with an 802.11 transmission, then the device 110 may monitor a subsequent sub-slot (sub-slot k+1) at block 814. In an embodiment, monitoring sub-slot k+1 occurs in a manner consistent with monitoring sub-slot k in block 808.

As before, the device may transmit a signal during sub-slot k+1 if no signal traffic is found (block 432). If signal traffic is found, at block 816, the device(s) may continue to monitor signal traffic in the remaining sub-slots up to sub-slot n with the same monitoring method described at block 808.

After the final sub-slot (sub-slot n) of the time slot is monitored at block 816, or a signal is transmitted by the device(s) at block 432, the method 800 may return to block 808, and the processor 114 of device(s) 110 may select another time slot and subdivide it. Accordingly, method 800 may increase the likelihood of access for wireless network transmissions on unlicensed bands by allowing transmissions in time slots where 802.11 traffic will be present for only part of the time slot. For example, if there is 802.11 traffic only occupying only initial sub-slot k of a time slot, subdivision into sub-slots allows the device 110 to transmit at sub-slot k+1 rather than having to wait until the next time slot in the subset.

In one embodiment, the processor 114 excludes one or more sub-slots of the from monitoring as part of the dynamic duty cycle. In this case, the dynamic duty cycle includes sub-slots (e.g., k, k+1 . . . n−x . . . n) only until the n−x sub-slot. Monitoring only this set of sub-slots may preserve one or more sub-slots after sub-slot n−x that would not provide sufficient time to send a transmission, or may eliminate monitoring sub-slots that are not required for transmission. In another embodiment, the number of sub-slots monitored included in the dynamic duty cycle is varied based on the amount of data that the system is required to send. In this case, y is the number of sub-slots needed to transmit a data packet and the device 110 only monitors subslots (k, k+1 . . . n−x . . . n) until the sub-slot n−x is monitored, where x is larger than y.

FIGS. 9-11 show further examples of time slot selection and subdivision in accordance with the dynamic duty cycle of the present disclosure, as described above with reference to FIGS. 7-8. FIG. 9 shows an exemplary set of transmissions 900 during a time period on an unlicensed band channel. 802.11 transmissions 902, 906 are represented by unshaded boxes and are transmitted at several times during the time period. Other wireless network signals 904, 908, which may be 5G transmissions, are represented by shaded boxes and are also present on the unlicensed band channel. The transmissions do not overlap to avoid signal collisions. Collision avoidance is achieved using the channel selection and signal monitoring of FIGS. 4-6 and dynamic duty cycle is implemented according to FIGS. 7-8. In some embodiments, the transmissions 902, 904, 906, 908 are spaced to allow adequate room for any necessary signal preambles or guard intervals to ensure that transmissions do not collide.

FIG. 10 shows an exemplary set of time slot divisions 1000 during a time period on an unlicensed band channel, in conjunction with the discussion of time slots in FIG. 7. In this example, the time period is subdivided into a plurality of time slots 1010, 1012, 1014, 1016. A device 110 (FIG. 3) may select a subset of these time slots, as described at block 706 of method 700, and determine whether there is an 802.11 transmission associated with each time slot of the selected subset of time slots, as described at block 708 of method 700. In an embodiment, the device 110 monitors the channel for at least the length of a Short Interframe Space (SIFS) or PCF Interframe Space (PIFS) to determine whether an 802.11 transmission is present. This ensures that the device 110 does not monitor during an interframe space of an active 802.11 transmission, which would result in a false positive determination that the channel is clear.

In this example, shaded time slots 1010, 1012, 1014 have been selected by the device, and these eligible time slots will be passively or actively monitored for signal traffic, as described in methods 500 (FIG. 5) and 600 (FIG. 6), respectively. Unshaded time slots 1016 are not selected and will not be monitored for signal traffic. In the example of FIG. 10, a random number of unselected time slots are placed in between selected time slots. As discussed in conjunction with FIG. 7, the number of unselected time slots placed between selected time slots may increase in proportion to 802.11 signal traffic on the channel. In another embodiment not shown in FIG. 10, sequential time slots are selected by the device 110 for traffic monitoring.

FIG. 11 shows a plurality of time slots 1100 on an unlicensed band channel in conjunction with the discussion of sub-slots in FIG. 8. Shaded time slots 1010, 1012, 1014 have been selected by a wireless communication device 110 for signal traffic monitoring. These time slots were consequently subdivided into a number of sub-slots as described at block 808 of method 800. Time slot 1010 was found to have no 802.11 signal traffic at the time of monitoring, so the device 110 may transmit a transmission during the entire time slot 1010, as described above. Time slots 1012, 1014 were found to have 802.11 signal traffic at the time of monitoring (i.e., at initial sub-slot 1102). After the device 110 has determined the traffic loads for each of the sub-slots, the device 110 may transmit on the channel during sub-slots 1104 that are found to be clear of 802.11 signal traffic. In some embodiments, the device 110 may select to transmit during sub-slots 1102, 1104 that have less signal traffic than other sub-slots 1102, 1104. In the example of FIG. 11, unselected time slots are not subdivided. In other embodiments, a subset of unselected time slots may also be subdivided.

FIGS. 12-17 describe various ways in which device 110 of FIG. 3 may detect the presence or absence of 802.11 signals in a channel in conjunction with FIGS. 4-8 above.

FIG. 12 shows an exemplary 802.11 transmission 1200 with preambles 1202, 1204, 1206. In one embodiment, the coexistence module 120 in conjunction with the antenna module 128 receives the preambles 1202, 1204, 1206 via antenna 130 from the wireless network. In one embodiment, the processor 114 decodes preambles and headers that are prepended to an 802.11 wireless network Protocol Data Unit (PPDU) 1208 in a complete 802.11 transmission 1200 in order to detect an 802.11 transmission. The processor 114 of device 110 (FIG. 3) may be configured to decode the Short Training Field (STF) 1202 to determine if an 802.11 transmission is ongoing on an unlicensed band. The format of the STF 1202 is distinct, and indicates to any device capable of decoding it that an 802.11 transmission is commencing. The processor 114 may also decode the Long Training Field (LTF) 1204 to estimate the channel on which the transmission 1200 is ongoing. Finally, the processor 114 may decode the Legacy-Compatible Signal Field (LSIG) which includes information in bit form about the rate 1210, length 1212, and toil 1214 of the entire transmission 1200. By knowing the channel and duration of the 802.11 transmission, a device 110 can schedule wireless network transmissions that do not interfere with the 802.11 transmission. Although this method may allow the device 110 to effectively avoid collision with 802.11 traffic, the device may need to detect transmission 1200 from the beginning to decode the preambles 1202, 1204, 1206.

An alternative method, which may be used in conjunction with decoding preambles, is to detect guard intervals that may be present on 802.11 transmissions. This may allow a device 110 to detect an ongoing 802.11 transmission in the event that the device 110 is not listening during the preambles 1202, 1204, 1206. FIG. 13 shows an exemplary 802.11 transmission 1300 with an 802.11 PPDU 1304 surrounded by Orthogonal Frequency-Division Multiplexing (OFDM) symbols 1302. In one embodiment, the coexistence module 120 in conjunction with the antenna module 128 receives the OFDM symbols 1302 via antenna 130 from the wireless network. In one embodiment, processor 114 of a device 110 (FIG. 3) may be configured to detect if OFDM symbols 1302 are present on an unlicensed channel by detecting the time between cyclical prefixes. 802.11 transmissions are known to use OFDM symbols that are 4 μs in length with a 0.8 μs cyclical prefix (i.e., the first and last 0.8 μs of any OFDM symbol are identical). In some embodiments, the processor 114 may be configured to compute a moving average over 0.4 μs to detect 0.8 μs cyclical prefixes that occur 2.4 μs apart, indicating that 4 μs OFDM symbols are present on the channel, which further indicates to a high degree of certainty that an 802.11 transmission is ongoing.

Figure 16:
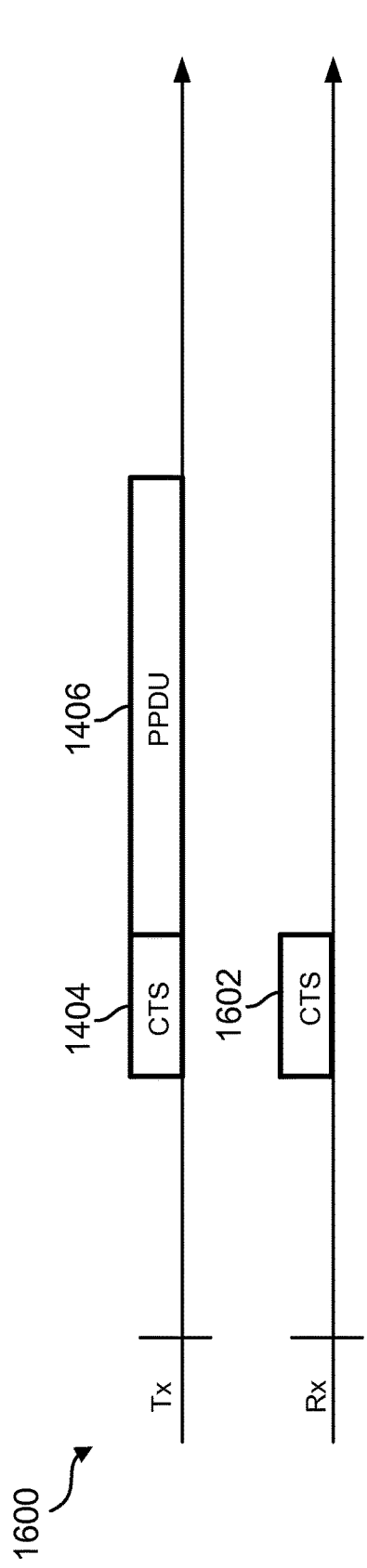
FIG. 16 illustrates a diagram of another alternative for transmitting and receiving collision avoidance signals for 802.11 compatible devices in accordance with various aspects of the present disclosure.

The device(s) 110 can also be configured to provide signaling to 802.11 devices indicating the presence of and/or scheduling of 5G unlicensed transmissions in order to avoid collision with the 802.11 device transmissions. This can be done by sending signals that the 802.11 protocol recognizes for scheduling. For example, the device(s) 110 can transmit 802.11 Request to Send (RTS) and/or Clear to Send (CTS) signals that can be received and interpreted by 802.11 compatible devices to effectively reserve time slots for the wireless transmissions as shown in FIGS. 14-16. The RTS and CTS indicate to 802.11 compatible devices to defer transmissions by a time length indicated in the RTS and CTS.

In FIG. 14, a diagram 1400 of transmission (Tx) and receiver (Rx) functions of a device 110 (FIG. 3) are shown. The device 110 transmits an RTS signal 1402 prior to the wireless network PPDU 1406 during a transmission period of the device. As noted above, this indicates to all devices in range that they should defer transmissions for an indicated length of time. The device 110 may be configured to leave a transmission gap for a CTS signal 1404 to be received by the receiver of the device 110. All devices that receive the RTS signal 1402 should send a CTS signal 1404 in response, thereby ensuring that anything in range of the receiving device is also deferring transmissions to keep the channel clear for receipt.

In FIG. 15, diagram 1500 of transmission (Tx) and receiver (Rx) functions of a device 110 (FIG. 3) are shown. In this embodiment, the device 110 sends only a CTS signal 1404, which may be self-addressed. The CTS and RTS serve the same function of causing all devices in range to defer transmission to keep the channel clear, however, by not sending an RTS the device 110 need not wait for all receiving devices to send a CTS in response. This lowers overhead. Because 5G transmissions do not require a SIFS (as may be required by 802.11 transmissions), a wireless network PPDU 1406 may be sent by device 110 directly after finishing transmission of the CTS signal 1404. In one aspect (shown in FIGS. 14-16), the CTS signal 1404 may be configured to include information on the length of the PPDU 1406 to alert 802.11 compatible devices accessing the unlicensed network to defer transmissions for the time corresponding to the length of the PPDU 1406.

In FIG. 16, diagram 1600 of transmission (Tx) and receiver (Rx) functions of a device 110 (FIG. 3) are shown, describing an embodiment similar to that of diagram 1500. In this embodiment, unlike that of diagram 1500, receiving 802.11 compatible devices may transmit a CTS 1602 at the same time that the device 110 (FIG. 3) may transmit a CTS signal 1404. This has the advantage of ensuring that nodes that may be in range of receiving devices but not in range of the device 110 are notified by the CTS signal to defer transmissions and keep the channel clear. This approach may therefore better protect the transmissions of device 110 from hidden 802.11 nodes. In some embodiments, this is possible because cellular wireless protocols such as LTE, 5G, etc. allow the assumption that UEs 101, 102 and base stations 103 have synchronized timing, and a simultaneous transmission of a CTS signal may be arranged.

In some embodiments, the collision avoidance signals described in FIGS. 14-16 may be decoded by both 802.11 compatible devices and devices compatible with other radio access technologies (RATs) such as LTE, 5G, etc. This allows a single collision avoidance signal to serve for both 802.11 and other RATs without using further network resources.

Figure 17:
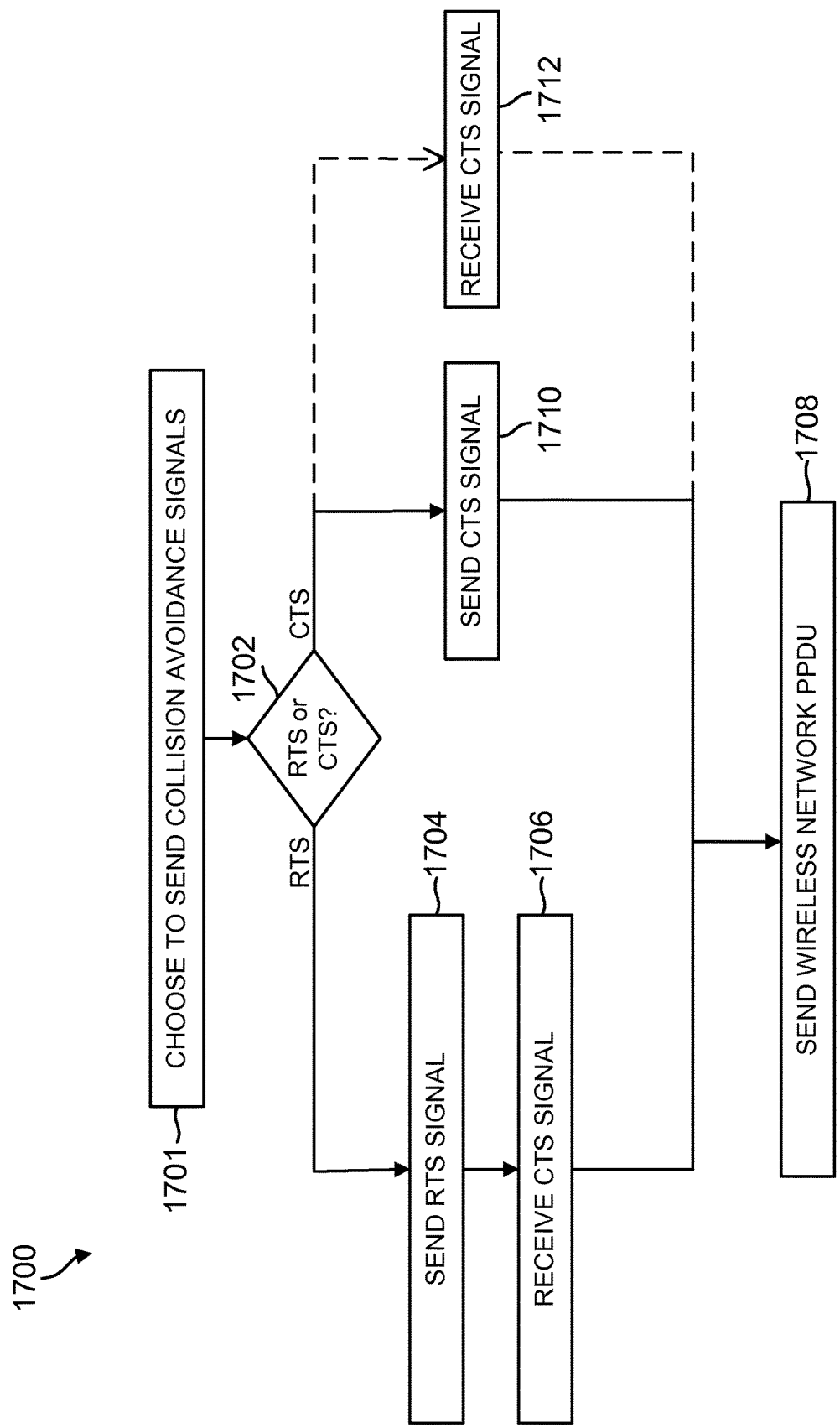
FIG. 17 is a flowchart illustrating a method for implementing collision avoidance signaling in accordance with FIGS. 14-16.

The flowchart of FIG. 17 shows an exemplary method 1700 of implementing collision avoidance signaling in accordance with FIGS. 14-16. Beginning at block 1701, the processor 114 of device 110 (FIG. 3) may decide to send collision avoidance signals to 802.11 compatible devices. Moving to decision block 1702, the processor 114 may choose between sending an RTS signal in accordance with the embodiment of FIG. 14 or sending a CTS signal in accordance with the embodiments of FIGS. 15-16.

If the processor 114 chooses to send an RTS signal, the method 1700 progresses to block 1704, and the processor 114 causes the transceiver 122 in conjunction with the antenna module 128 to transmit an RTS signal 1402, as described above with reference to FIG. 14. Moving to block 1706, the device 110 receives CTS signals 1404 from devices that received the RTS signal 1402, as described above with reference to FIG. 14. Moving to block 1708, the device may transmit a wireless network PPDU 1406, as described above with reference to FIG. 14.

Returning to decision block 1702, if the processor 114 chooses to send a CTS signal, for example to reduce overhead, the method 1700 proceeds to block 1710, and the processor 114 causes the transceiver 122 in conjunction with the antenna module 128 to transmit an CTS signal 1404, as described above with reference to FIG. 15. Moving to block 1708, the device may immediately transmit a wireless network PPDU 1406, as described above with reference to FIG. 15. In some embodiments, as described by FIG. 16, device 110 may send a CTS signal 1404 while 802.11 compatible devices in range to receive the CTS signal 1404 simultaneously send their own CTS signal 1602. In this case, at block 1712, the device 110 receives the CTS signals 1602 from 802.11 compatible devices at the same time as it sends the CTS signal 1404 in block 1710.

Figure 18:
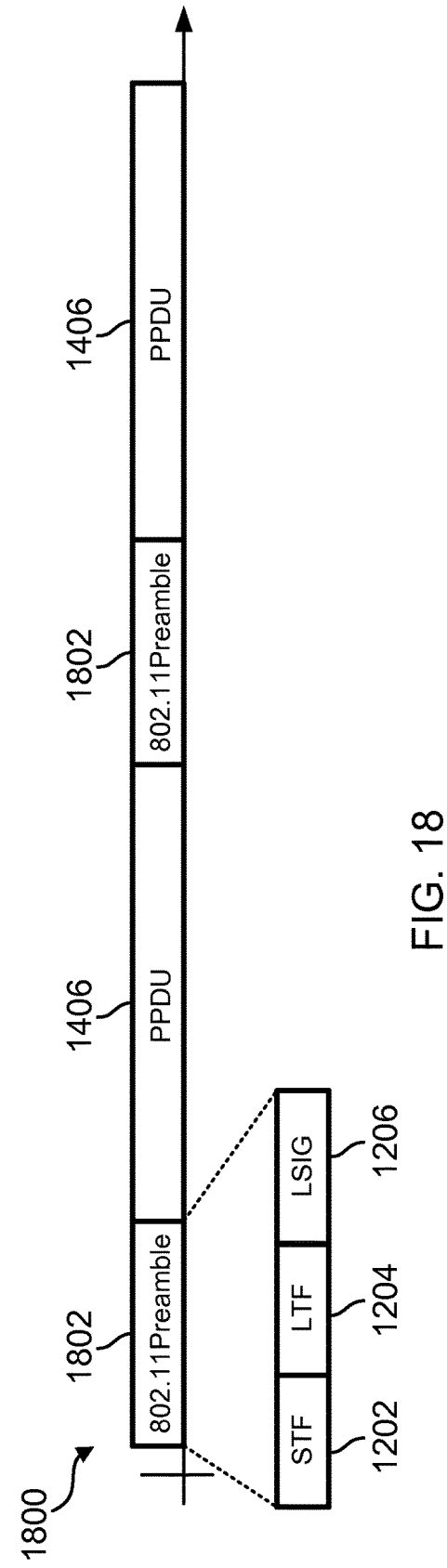
FIG. 18 illustrates a diagram of another alternative for transmitting collision avoidance signals for 802.11 compatible devices in accordance with various aspects of the present disclosure.

As an alternative to prepending RTS and CTS signals to a wireless transmission, a device 110 may also be able to alert 802.11 compatible devices on an unlicensed band to other types of the impending non-802.011 transmissions (e.g., 5G transmissions) of device 110 by inserting 802.11 preambles into wireless network transmissions. For example, as shown in FIG. 18, 802.11 preambles 1802 may be inserted into wireless transmission 1800. In this case, one or more 802.11 preambles 1802, which may comprise STF 1202, LTF 1204, and LSIG signals 1206, are inserted before each wireless network PPDU 1406. These 802.11 preambles 1802 may alert 802.11 compatible devices on an unlicensed band to impending wireless network transmissions.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for managing wireless communications, the method comprising:
   monitoring, using at least a first wireless communication device configured to communicate using at least one of a first radio access technology on a licensed band or a second radio access technology on an unlicensed band, traffic on a channel of the unlicensed band during a subset of time slots of the channel, wherein monitoring the traffic on the channel comprises:
      determining whether a signal is being transmitted in the unlicensed band during one or more time slots of the subset of time slots; and
      in response to determining that the signal is being transmitted, dynamically varying a duty cycle between adjacent time slots of the subset of time slots to update the subset of time slots; and
   communicating, using the first wireless communication device, data with a second wireless communication device during a transmission time slot selected based on the updated subset of time slots.

2. The method of claim 1, further comprising selecting the channel among a plurality of channels of the unlicensed band based on determining that the channel has a lower traffic load than at least one other channel of the unlicensed band.

3. The method of claim 1, wherein each time slot of the subset of time slots is separated from an adjacent time slot of the subset of time slots by a random number of unselected time slots based on the monitored traffic on the channel.

4. The method of claim 1, further comprising subdividing one or more time slots of the subset of time slots into a plurality of sub-slots.

5. The method of claim 4, wherein the monitoring traffic on the channel of the unlicensed band comprises determining whether a signal is being transmitted in the unlicensed band during one or more sub-slots of the plurality of sub-slots.

6. The method of claim 4, wherein the monitoring traffic on the channel of the unlicensed band further comprises varying a number of sub-slots of the plurality of sub-slots that are monitored for traffic based on an amount of data to be transmitted.

7. The method of claim 1, wherein the monitoring traffic on the channel of the unlicensed band further comprises determining that there is an ongoing transmission on the unlicensed band by decoding a reference signal.

8. The method of claim 7, wherein the reference signal includes one or more of the following: a Short Training Field, a Long Training Field, or a Legacy-Compatible Signal Field.

9. The method of claim 1, further comprising transmitting or receiving traffic load data on the channel to or from the second wireless communication device.

10. The method of claim 1, further comprising:
transmitting a probe signal on the channel; and
monitoring one or more channels for a probe response to determine a traffic load on the channel.

11. A first wireless communication device, comprising:
a processor and a co-existence module that monitor traffic on a channel of an unlicensed band during a subset of time slots of the channel, wherein the processor and the co-existence module are configured to:
determine whether a signal is being transmitted in the unlicensed band during one or more time slots of the subset of time slots; and
in response to determining that the signal is being transmitted, dynamically vary a duty cycle between adjacent time slots of the subset of time slots to update the subset of time slots; and
a transmitter that communicates data with a second wireless communication device during a transmission time slot selected based on the updated subset of time slots.

12. The device of claim 11, wherein the processor and the co-existence module are further configured to select among a plurality of channels of the unlicensed band based on determining that the channel has a lower traffic load than at least one other channel of the unlicensed band.

13. The device of claim 11, wherein each time slot of the subset of time slots is separated from an adjacent time slot of the subset of time slots by a random number of unselected time slots based on the monitored traffic on the channel.

14. The device of claim 11, wherein the processor and the co-existence module are further configured to subdivide one or more time slots of the subset of time slots into a plurality of sub-slots.

15. The device of claim 14, wherein the processor and the co-existence module are further configured to determine whether a signal is being transmitted in the unlicensed band during one or more sub-slots of the plurality of sub-slots.

16. The device of claim 14, wherein the processor and the co-existence module are further configured to determine whether a signal is being transmitted in the unlicensed band only during a subset of the plurality of sub-slots.

17. The device of claim 14, wherein the processor and the co-existence module are further configured to vary a number of sub-slots of the plurality of sub-slots based on an amount of data to be transmitted.

18. The device of claim 11, wherein the processor and the co-existence module are further configured to determine that there is an ongoing transmission on the unlicensed band by decoding a reference signal.

19. The device of claim 18, wherein the reference signal includes one or more of the following: a Short Training Field, a Long Training Field, or a Legacy-Compatible Signal Field.

20. The device of claim 11, further comprising a receiver configured to receive traffic load data from the second wireless communication device, and wherein the transmitter is further configured to transmit traffic load data to the second wireless communication device.

21. The device of claim 11, wherein the transmitter is further configured to transmit a probe request on the channel and wherein the processor and the co-existence module are further configured to monitor one or more channels for a probe response to determine a traffic load on the channel.

22. A wireless communication device, comprising:
means for monitoring, using at least a first wireless communication device, a channel of an unlicensed band during a subset of time slots of the channel, wherein the means for monitoring is configured to:
determine whether a signal is being transmitted in the unlicensed band during one or more time slots of the subset of time slots; and
in response to determining that the signal is being transmitted, dynamically vary a duty cycle between adjacent time slots of the subset of time slots to update the subset of time slots; and
means for transmitting, using the first wireless communication device, data with a second wireless communication device during a transmission time slot selected based on the updated subset of time slots.

23. The device of claim 22, further comprising means for selecting among a plurality of channels of the unlicensed band based on determining that the channel has a lower traffic load than at least one other channel of the unlicensed band.

24. The device of claim 22, wherein each time slot of the subset of time slots is separated from an adjacent time slot of the subset of time slots by a random number of unselected time slots based on the monitored traffic on the channel.

25. The device of claim 22, further comprising means for subdividing one or more time slots of the subset of time slots into a plurality of sub-slots.

26. The device of claim 25, further comprising means for determining whether a signal is being transmitted in the unlicensed band during one or more sub-slots of the plurality of sub-slots.

27. The device of claim 25, further comprising means for determining whether a signal is being transmitted in the unlicensed band only during a subset of the plurality of sub-slots.

28. The device of claim 25, further comprising means for varying a number of sub-slots of the plurality of sub-slots based on an amount of data to be transmitted.

29. The device of claim 22, further comprising means for determining that there is an ongoing transmission on the unlicensed band by decoding a reference signal.

30. The device of claim 29, wherein the reference signal includes one or more of the following: a Short Training Field, a Long Training Field, or a Legacy-Compatible Signal Field.

31. The device of claim 22, further comprising:
means for receiving traffic load data from the second wireless communication device; and
means for transmitting traffic load data to the second wireless communication device.

32. The device of claim 22, further comprising:
means for transmitting a probe request on the channel; and
means for monitoring one or more channels for a probe response to determine a traffic load on the channel.

* * * * *